United States Patent
Yu et al.

(10) Patent No.: US 9,979,563 B2
(45) Date of Patent: May 22, 2018

(54) CHAIN-TYPE WIRELESS SENSOR NETWORK-ORIENTED HYBRID MEDIA ACCESS CONTROL METHOD

(71) Applicant: SHENYANG INSTITUTE OF AUTOMATION OF THE CHINESE ACADEMY OF SCIENCES, Liaoning (CN)

(72) Inventors: Haibin Yu, Liaoning (CN); Wei Liang, Liaoning (CN); Xiaoling Zhang, Liaoning (CN); Chaofan Ma, Liaoning (CN)

(73) Assignee: SHENYANG INSTITUTE OF AUTOMATION OF THE CHINESE ACADEMY OF SCIENCES, Shenyang, Liaoning (CN)

( * ) Notice: Subject to any disclaimer, the term of this patent is extended or adjusted under 35 U.S.C. 154(b) by 65 days.

(21) Appl. No.: 14/898,511

(22) PCT Filed: Oct. 22, 2014

(86) PCT No.: PCT/CN2014/089110
§ 371 (c)(1),
(2) Date: Dec. 15, 2015

(87) PCT Pub. No.: WO2015/109874
PCT Pub. Date: Jul. 30, 2015

(65) Prior Publication Data
US 2016/0134436 A1    May 12, 2016

(30) Foreign Application Priority Data
Jan. 24, 2014    (CN) .......................... 2014 1 0036181

(51) Int. Cl.
*H04L 12/64* (2006.01)
*H04W 4/00* (2018.01)
*H04W 52/02* (2009.01)

(52) U.S. Cl.
CPC ......... *H04L 12/6418* (2013.01); *H04W 4/005* (2013.01); *H04W 52/0212* (2013.01);
(Continued)

(58) Field of Classification Search
CPC ....... H04L 12/6418; H04L 2012/6459; H04W 4/005; H04W 52/0212; Y02B 60/50; Y02D 70/00
See application file for complete search history.

(56) References Cited

U.S. PATENT DOCUMENTS

| 8,724,598 | B1 * | 5/2014 | Walker, III | H04W 74/02 370/329 |
| 2013/0272293 | A1 * | 10/2013 | Nguyen | H04W 74/02 370/347 |
| 2015/0036570 | A1 * | 2/2015 | Jeong | H04W 52/0216 370/311 |

FOREIGN PATENT DOCUMENTS

| CN | 101013926 A | 8/2007 |
| CN | 102143570 A | 8/2011 |

(Continued)

OTHER PUBLICATIONS

International Search Report for PCT/CN2014/089110, dated Jan. 26, 205 in English & Chinese Language.

*Primary Examiner* — Kwang B Yao
*Assistant Examiner* — Moo Ryong Jeong
(74) *Attorney, Agent, or Firm* — Smith, Gambrell & Russell, LLP.

(57) ABSTRACT

The present invention relates to wireless network technologies, and particularly to a chain-type wireless sensor network-oriented hybrid media access control (MAC) method. The present invention fully considers features of a chained or linear topology of a wireless sensor network applied in power transmission line monitoring and the like, adopts different access policies at different periods of the network, and proposes a method of time division access control Pipelined TDMA during busy periods and contention access control S-XMAC during idle periods. During busy periods, a pipelined scheduling transmission method is used to avoid (Continued)

the problem of hidden terminals so as to improve transmission reliability and resource utilization. During idle periods, different MAC parameters are set for cluster head members and ordinary cluster members, so that the cluster head members can respond to requests in a more timely manner, and meanwhile, the ordinary cluster members save energy as much as possible, thereby meeting requirements for network real-time quality of the application system while saving energy of the network.

9 Claims, 2 Drawing Sheets

(52) U.S. Cl.
CPC ...... *H04L 2012/6459* (2013.01); *Y02D 70/00* (2018.01); *Y02D 70/1222* (2018.01); *Y02D 70/146* (2018.01)

(56) References Cited

FOREIGN PATENT DOCUMENTS

| | | |
|---|---|---|
| CN | 102264146 A | 11/2011 |
| WO | 2013046069 A1 | 4/2013 |

* cited by examiner

CHAIN-TYPE WIRELESS SENSOR NETWORK-ORIENTED HYBRID MEDIA ACCESS CONTROL METHOD

TECHNICAL FIELD

The present invention relates to wireless network technology, and particularly to a chain-type wireless sensor network-oriented hybrid media access control method.

DESCRIPTION OF RELATED ART

In recent years, wireless sensor networks have been widely applied. Applications in some fields, such as power transmission line monitoring, railway monitoring, subway monitoring, and border monitoring is characterized by high decentralization, long distance, and difficulty in maintenance. The periodic manual inspection, helicopter inspection, and robot inspection widely applied before not only necessitate high overhead and labor intensity, but also involve difficulty in monitoring the whole system continuously. Therefore, a network-based monitoring system becomes a necessary approach to realize such application. However, there exist problems in the wired network-based monitoring system such as difficulty in installation, high cost, and inconvenient maintenance. So, monitoring systems based on wireless technology are a trend for development in the future. However, Mobile communication technologies such as GSM, WIMAX, and CDMA are still too expensive for an omni-directional monitoring system, so these existing systems are used in some key links only. The wireless sensor network has become the first choice for such applications by virtue of real-time online, large-area coverage, self-configuration and serf-organization, low cost, flexibility, and convenient maintenance.

For applications such as power transmission line monitoring, railway monitoring, subway monitoring, and border monitoring mentioned above, the wireless sensor network is mostly disposed in unattended areas, causing difficulty in replacement of batteries and high battery cost. Therefore, low consumption becomes the first demand of such wireless sensor network. In general, cluster heads and cluster members are required to have more than a 5-year service life in such systems. In addition, such applications raise requirements for the real-time quality of the wireless sensor network. Take the Supervisory Control and Data Acquisition (SCADA) in the smart grid as an example, the data acquisition cycle is generally 4~8 seconds, especially when it is necessary to transmit data to the monitoring center in case of abnormal events or warnings.

The Media Access Control (MAC) method, which controls the rational use of wireless communication resources directly, is a key technology to determine the performance of the wireless sensor network. The features of applications such as power transmission line monitoring, railway monitoring, subway monitoring, and border monitoring bring the following challenges for the design of wireless sensor network MAC protocols:

The topology of the wireless sensor network applied in the applications mentioned above generally takes on a chain or line shape, but it also has the feature of local intensiveness. Take the power transmission line as an example, most of the sensors are installed on the pole or the area around the pole. The diameter of the whole intensively installed area is less than 10 m, and only a few of the sensors are installed on power transmission lines within a span of 200~1000 m, such as galloping monitoring sensors. A large number of intensively-disposed local areas are present in the chain-type network. The feature of local intensiveness makes the problem of hidden terminals prominent.

Two types of data are generally produced in the application mentioned above: periodic monitoring data and non-periodic data such as warnings, network control, system queries, and configuration. The work period corresponding to the network is divided into a busy period in which a large amount of periodic data is transmitted and an idle period in which only a small amount of non-periodic data is transmitted. How to guarantee the real-time quality while saving energy in the face of the time-variable traffic and complex imbalance of the network is another conundrum.

The existing wireless sensor network MAC protocol still cannot meet the requirements of the applications above, specifically in: (1) adoption of the time division multiple access method can effectively avoid the problem of hidden terminals to cope with the transmission in a busy period. However, research on how to design an effective TDMA mechanism to guarantee the quality of real-time in network at low consumption for a chain-type topology network is only in its infancy. (2) the existing mesh-oriented low data-rate wireless sensor network MAC protocol, such as X-MAC, SMAC, and TMAC, the real-time quality of which depends on the duty cycle of the receiver, can cope with the transmission of non-periodic data which requires low real-time quality. Therefore, how to guarantee high real-time quality of the transmission of periodic data and transmission of urgent data becomes a challenging conundrum.

BRIEF SUMMARY OF THE INVENTION

In order to overcome the disadvantages found in the research on the existing chained or linear topology network-oriented MAC protocol where low consumption and high real-time quality cannot be effectively guaranteed, and to solve problems of how to meet the requirements of energy-saving and real-time quality, avoid the problem of hidden terminals and adjust the roles of cluster heads and cluster members to reach a balance between energy saving and real-time quality in adaptive network traffic for MAC protocols, the present invention proposes a chain-type wireless sensor network-oriented hybrid media access control method with the aim of enabling the cluster heads and cluster members to respond to requests in a timely manner and the cluster members to save energy as much as possible. Thereby meeting the rigorous requirements for real-time quality in network of the system while saving energy.

To solve the technical problems above, the present invention adopts the following technical solution: a chain-type wireless sensor network-oriented hybrid media access control method.

In the wireless sensor network, if the proportion of cluster heads and cluster members which simultaneously transmit data reaches a certain value, a time division access control Pipelined TDMA is used, including the following steps:

Step of acquisition within clusters: in every time slot, some of the cluster heads in the network acquire the sensor data of all cluster members in subsequent clusters.

Step of data forwarding: the cluster heads forwards the acquired sensor data;

in the wireless sensor network, if the proportion of cluster heads and cluster members which simultaneously transmit data does not reach a certain value, a contention access control S-XMAC is used, i.e. wake-up time scheduling based on position information: wake up the cluster heads and cluster members in order based on the geographical positions of the cluster heads and cluster members in the network.

The said subsequent cluster is the cluster head adjacent to the current cluster head away from the Sink.

Said some of the cluster heads are: assuming the hop count of clusters is expressed by hop, 1) the some of cluster heads in the first time slot are cluster heads with 3% hop==0, i.e. the third cluster heads after every two cluster heads, counting from the third cluster head from the direction away from the Sink of cluster heads and cluster members;

2) the some of cluster heads in the second time slot are cluster heads with 3% hop==2, i.e. the aggregation of adjacent cluster heads of the some of cluster heads in the first time slot approaching the Sink;

3) the some of cluster heads in the third time slot are cluster heads with 3% hop==1, i.e. the aggregation of adjacent cluster heads of the some of cluster heads in the second time slot approaching the Sink;

Said step of acquisition within clusters and/or step of data forwarding require(s) three time slots to complete network transmission scheduling and to prevent data simultaneously transmitted by all cluster members and adjacent clusters from collision with each other.

The process of each cluster member transmitting data includes:

time slots are secondarily divided into many mini-time slots;

mini-time slot allocation based on address designation algorithm; cluster members select corresponding mini-time slots in ascending order of addr values to send data;

said addr value is: the allocated address addr∈[1,Ni] of the cluster member when a cluster member is included in the network, wherein Ni is the number of cluster members in the $i^{th}$ cluster.

Said step of data forwarding is realized by that: multiple continuous time slots are allocated to a cluster head, which utilizes the multiple continuous time slots to transmit multiple data packages.

Said S-XMAC is realized by that:

each cluster head and cluster member periodically sleeps and wakes up by duty cycle $T_{duty\text{-}cycle}$;

the cluster head waiting for transmitting data does not activate a radio frequency to transmit the preamble codes, but to transmit the preamble codes containing the address information of the cluster heads of the transmitting end and the destination receiving end, ½ $T_{preamble}$ ahead of the cluster wake-up time of the destination receiving end instead;

after transmission of the preamble codes, the cluster head waiting for transmitting data waits for the preamble codes acknowledgment ACK from the cluster head of the destination receiving end, and the process is repeated. The cluster head will not transmit data until the ACK is received;

the receiving end is periodically woken up; if receiving a preamble codes containing the address information of the cluster head while awake, it judges whether the address information of the destination receiving end in the preamble codes agrees with its address information; if so, it sends back an ACK and notifies the transmitting end to transmit data; or else, it does not send back an ACK and goes into dormancy immediately.

Each cluster has the same cluster wake-up time in the duty cycle, which is realized by the cluster head recording the wake-up time of the adjacent cluster in the duty cycle $T_{duty\text{-}cycle}$.

The wake-up time is specifically designed as follows:

the wake-up time $T_{schedule}$ between adjacent cluster heads satisfies the following condition:

$$T_{schedule} > \delta + T_{offset\_max}$$

wherein, $\delta$ represents the time required by the cluster head for receiving data, including transmission time of the data excluding the preamble codes and Dwell Time; $T_{offset\_max}$ represents the maximum clock offset between the transmitting end and the receiving end, determined by the synchronizing cycle and the frequency offset of the cluster head and cluster members;

the address ADDRs of the cluster head and cluster members are used to indicate the position information of the cluster head and cluster members, and the wake-up time of the cluster head and cluster members are set as:

$$T_{wake} = n \times T_{duty\_cycle} - ((ADDR + 1) >> 1) \times T_{schedule}$$

$$n = \left\lceil \frac{((ADDR + 1) >> 1) \times T_{schedule}}{T_{duty\_cycle}} \right\rceil$$

wherein, $T_{wake}$ represents the wake-up time of the cluster head or cluster members, $T_{schedule}$ represents the wake-up time between adjacent cluster heads, $T_{duty\text{-}cycle}$ represents the duty cycle of the cluster head or cluster members, ADDR represents the address of the cluster head or cluster members, and the symbol ">>" is a right shift operator.

The maximum time required for transmitting the preamble codes $T_{preamble}$ is:

$$T_{preamble} = \begin{cases} T_{duty\_cycle} & (T_{duty\_cycle} \leq 2T_{offset\_max}) \\ 2T_{offset\_max} & (T_{duty\_cycle} > 2T_{offset\_max}) \end{cases}$$

wherein, $T_{preamble}$ represents the maximum time required for transmitting the preamble codes, $T_{duty\text{-}cycle}$ represents the duty cycle of the cluster head or cluster members, and $T_{offset\_max}$ represents the maximum clock offset between the transmitting end and the receiving end.

The present invention has the following advantages and beneficial effects:

1. The method according to the present invention is designed to adopt different access policies at different periods so as to improve throughput and reliability as much as possible during busy periods and to meet the requirements for real-time quality of communication while saving energy as much as possible during idle periods.

2. In the time division access control method (Pipelined TDMA) adopted during busy periods proposed in the present invention, a pipelined scheduling transmission method is used, avoiding the problem of hidden terminals, and its feature of timely forwarding reduces blocking and avoids package loss of the cluster head and cluster members due to too small of a cache, improves network throughput and communication reliability.

3. In the contention access control method during idle periods (S-XMAC) proposed in the present invention, on one hand, relaxed synchronization is employed to reduce the time for transmitting the preamble codes without adding extra communication overheads, saving energy; different MAC parameters are set for the cluster head and cluster members, so that the cluster head can respond to requests in a more timely manner, meeting requirements for network real-time quality of the applications, and the general cluster head and cluster members can save more energy. Besides, a wake-up time scheduling method based on positions is proposed based on the topology of the chained network, meeting the differentiated requirements for real-time quality of uplink data and downlink data.

DETAILED DESCRIPTION OF THE INVENTION

The present invention will be further detailed hereinafter in company with the drawings.

The present invention proposes a chain-type wireless sensor network-oriented hybrid media access control method. The main thought of the method is that different MAC parameters are adopted for the cluster head and cluster members. So that the cluster head can respond to requests in a more timely manner and the ordinary cluster members can save as much energy as possible. Thereby the method meets the requirements for network real-time quality of the applications while reducing energy consumption.

The present invention includes the time division access control Pipelined TDMA during busy periods and the contention access control S-XMAC during idle periods. In the wireless sensor network, the period in which the proportion of cluster heads and cluster members which simultaneously transmit data reaches a certain value (20%) is a busy one; or else it is an idle period.

Figure 1:
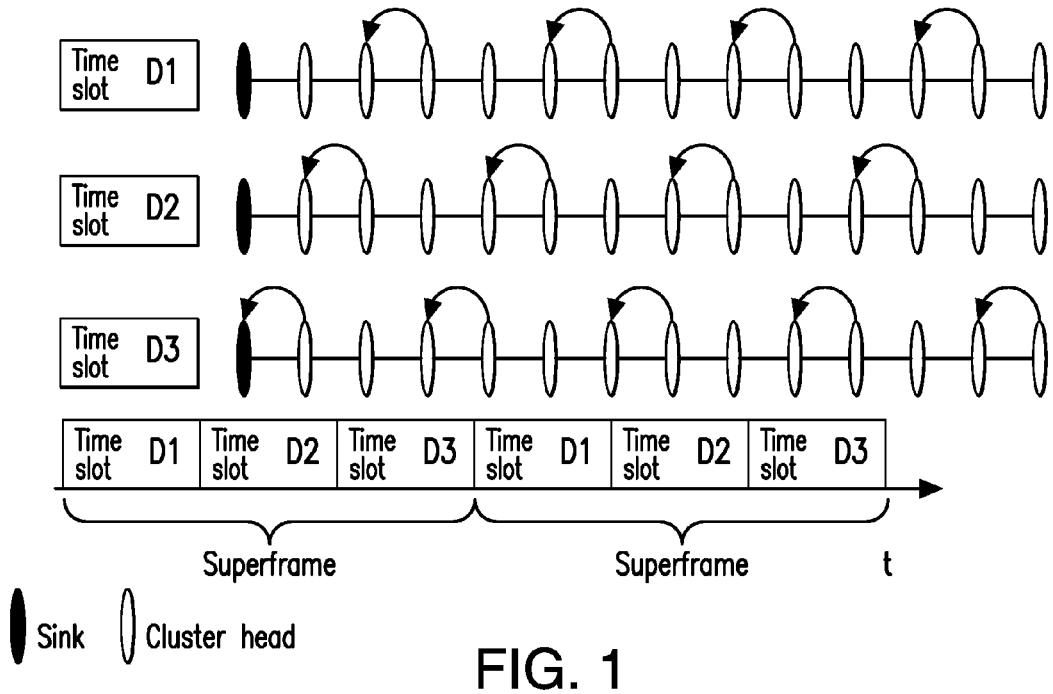
FIG. 1 is a schematic diagram of a pipelined transmission method.

(1) Time division access control Pipelined TDMA during busy periods includes acquisition within clusters and data forwarding, specifically including the following steps:

Step 1.1: acquisition within clusters. In every time slot, some of the cluster heads in the network acquire the sensor data of all cluster members in subsequent clusters, as shown in FIG. 1. In this stage, it takes only three time slots to complete network transmission scheduling and avoid the problem of hidden terminals by preventing the collision between the data, which are simultaneously transmitted by all cluster members and adjacent clusters. During the step of data acquisition, the cluster members are required to transmit data. The process of the cluster members transmitting data includes: firstly, dividing time slots into many mini-time slots; secondly, mini-time slot allocation based on address designation algorithm; when a cluster member is included in the network, an address addrε[1,Ni] within the cluster is allocated, wherein Ni is the number of cluster members in the $i^{th}$ cluster, and the cluster members select corresponding mini-time slots in ascending order of addr values to send data. The address designation algorithm ensures that the cluster members in one cluster have a unique addr, therefore avoiding collision of data among cluster members.

Said subsequent cluster is the cluster head adjacent to the current cluster head away from the Sink.

Said "some of cluster heads" in that some of the cluster heads in the network acquire the sensor data of all cluster members in subsequent clusters includes: 1) some of cluster heads in the first time slot are cluster heads that are counted from the third cluster head from the direction away from the Sink of cluster heads and cluster members and after every two cluster heads; 2) some of cluster heads in the second time slot are the aggregation of adjacent cluster heads of the some of cluster heads in the first time slot approaching the Sink; 3) the some of cluster heads in the third time slot are the aggregation of adjacent cluster heads of the some of cluster heads in the second time slot approaching the Sink. The specific definition of the "some of cluster heads" is: assuming the hop count of clusters is expressed by hop, 1) the some of cluster heads in the first time slot are cluster heads with 3% hop==0; 2) the some of cluster heads in the second time slot are cluster heads with 3% hop==2; 3) the some of cluster heads in the third time slot are cluster heads with 3% hop==1.

Step 12: data forwarding. The cluster heads complete the data forwarding in this stage. Multiple continuous time slots are allocated to a cluster head which utilizes the multiple continuous time slots to transmit multiple data packages. As the principle in the stage of acquisition within clusters, it takes only three time slots to complete data forwarding.

(2) Contention access control during idle periods—S-XMAC: specifically refers to wake-up time scheduling based on position information, and includes the following steps described below:

Step 2.1: each cluster head and cluster member periodically sleep and wake up by duty cycle $T_{duty-cycle}$. The cluster head records the wake-up time of the adjacent cluster in duty cycle $T_{duty-cycle}$, and the cluster members of each cluster have the same wake-up time, which is called cluster wake-up time, in the duty cycle;

The duty cycle refers to the work cycle of dormancy and wakeup of cluster heads and cluster members, the formal description of which is $T_{duty\_cycle}$:

$$T_{duty\_max} = \text{wakeup time} + \text{dwell time}$$

Figure 2:
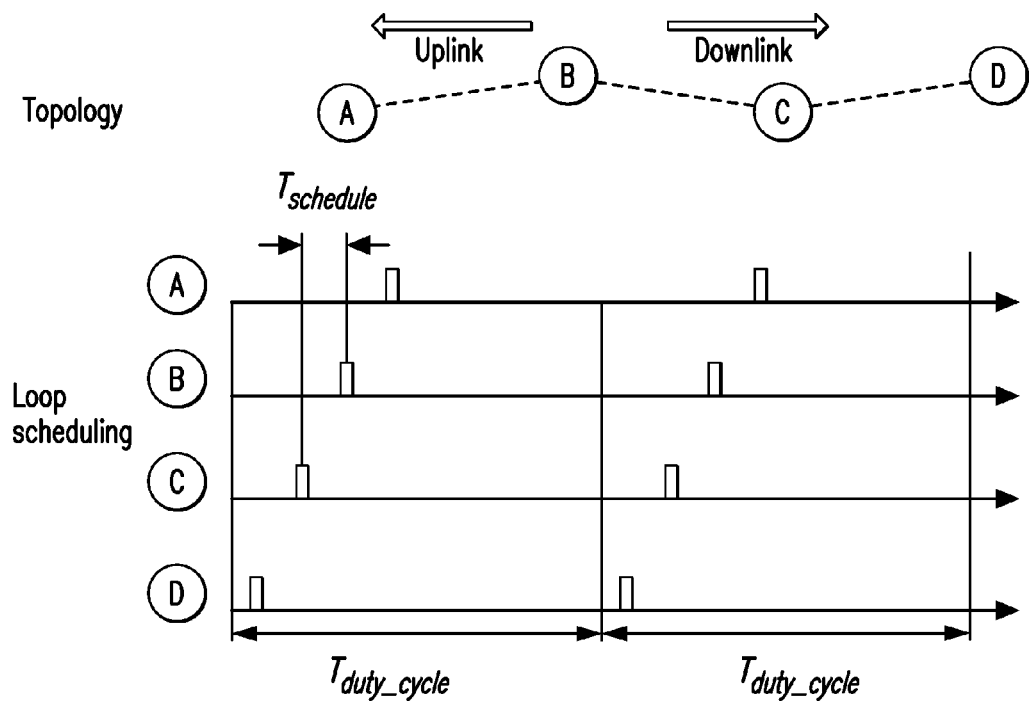
FIG. 2 is a wake-up time scheduling based on position information in S-XMAC.

The cluster wakeup time refers to wake-up time scheduling based on position information. The cluster heads are woken up in order based on the geographical position of the cluster heads and cluster members in the network. The synchronization error between the receiving and transmitting cluster heads and cluster members becomes bigger over time, which may cause the receiving cluster heads and cluster members to be woken up in the same duty cycle before the transmitting cluster heads and cluster members begin to send the preamble codes, thereby leading to communication failure. For the wake-up time scheduling based on position information designed in the present invention, taking the network topology and wakeup scheduling as shown in FIG. 2 as an example, the wake-up time between adjacent cluster heads needs satisfying the conditions below:

$$T_{schedule} > \delta + T_{offset\_max}$$

wherein, δ represents the time required by the cluster head for receiving data, including data transmission time and dwell time excluding the preamble codes; $T_{offset\_max}$ represents the maximum clock offset between the transmitting end and the receiving end, determined by the synchronizing cycle and the frequency offset of the cluster head and cluster members; S-XMAC is not limited to specific synchronization algorithm, the synchronization algorithm can be implemented in other services in the applications such as data acquisition, and no limitations are imposed by the present invention.

The address ADDRs of the cluster head and cluster members are used to indicate the position information of the cluster head and cluster members, and the wake-up time of the cluster head and cluster members are set as:

$$T_{wake} = n \times T_{duty\_cycle} - ((ADDR + 1) >> 1) \times T_{schedule}$$

$$n = \left\lceil \frac{((ADDR + 1) >> 1) \times T_{schedule}}{T_{duty\_cycle}} \right\rceil$$

Figure 3:
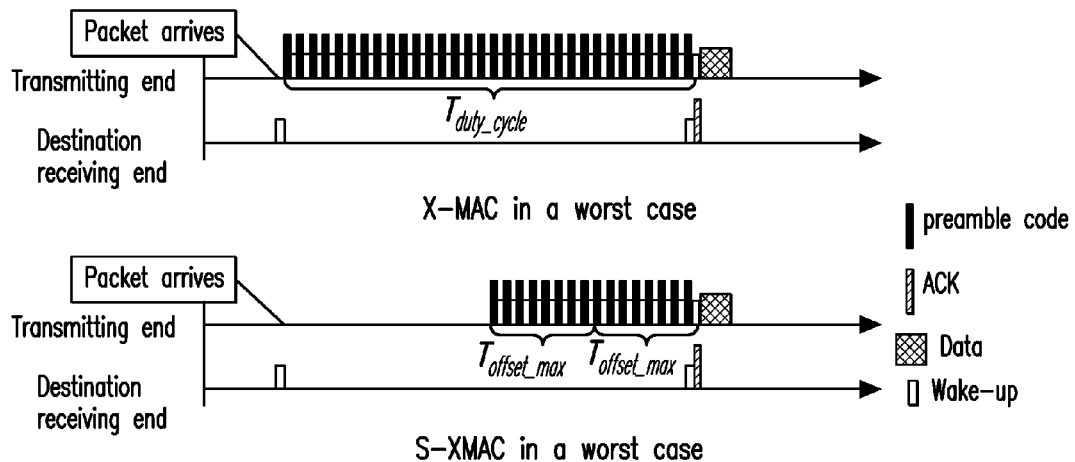
FIG. 3 is a comparison between the time for transmitting the preamble codes of X-MAC and that of S-XMAC in the worst situation.

Step 2.2: The cluster head of the data to be transmitted does not activate a radio frequency, but it transmits the preamble codes containing the address information of the cluster heads of the transmitting end and the destination receiving end ½$T_{preamble}$ ahead of the cluster wake-up time of the destination receiving end instead; as shown in FIG. 3, after transmission of the preamble codes, the cluster head of the data to be transmitted waits for the preamble codes acknowledgment ACK from the cluster head of the destination receiving end. The process is repeated until the ACK is received, then data is transmitted.

The $T_{preamble}$ refers to the maximum time required for transmitting the preamble codes, as defined below:

$$T_{preamble} = \begin{cases} T_{duty\_cycle} & (T_{duty\_cycle} \leq 2T_{offset\_max}) \\ 2T_{offset\_max} & (T_{duty\_cycle} > 2T_{offset\_max}) \end{cases}$$

Figure 4:
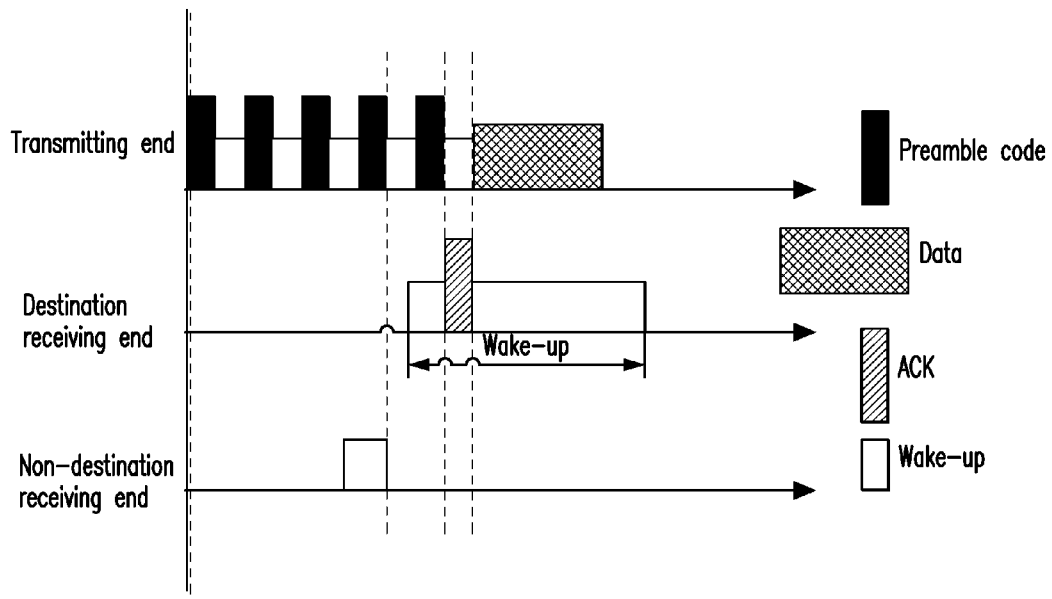
FIG. 4 is a schematic diagram of the running of X-MAC.

Step 2.3: the receiving end is periodically when up. If receiving a preamble codes containing the address information of the cluster head while awake, it judges whether the address information of the destination receiving end in the preamble codes agrees with its address information; if so, it sends back an ACK and notifies the transmitting end to transmit data; or else, it does not send back an ACK and goes into a sleep state immediately. The time for the destination receiving end to send back an ACK is as shown in FIG. 4.

What is claimed is:

1. A chain-type wireless sensor network-oriented hybrid media access control method, wherein
in a wireless sensor network, if a proportion of cluster heads arid cluster members which simultaneously transmit data reaches a certain value, a time division access control Pipelined TDMA is used, comprising:
in every time slot, cluster heads in the network acquire sensor data of all cluster members in subsequent clusters; and
cluster heads that acquire sensor data forward acquired sensor data;
in the wireless sensor network, if a proportion of cluster heads and cluster members which simultaneously transmit data does not reach a certain value, a contention access control S-XMAC is used, in which wake-up time scheduling is based on position information, comprising:
waking up cluster heads and cluster members in order based on geographical positions of cluster heads and cluster members in the network; and
the S-XMAC is realized by:
each cluster head and cluster member periodically sleeping and waking up by a duty cycle $T_{duty\text{-}cycle}$;
a cluster head waiting to transmit data does not activate a radio frequency to transmit preamble codes, but instead transmits preamble codes containing address information of a transmitting end cluster head and of a destination receiving end cluster head at a time ½ $T_{preamble}$ ahead of a wake-up time of the destination receiving end cluster head, $T_{preamble}$ representing the maximum time required for transmitting the preamble codes;
after transmission of the preamble codes, the cluster head waiting to transmit data waits for a preamble codes acknowledgment ACK from the destination receiving end cluster head, and repeats transmission of the preamble codes until a preamble codes acknowledgment ACK is received, the cluster head waiting to transmit data will not transmit data until a preamble codes acknowledgment ACK is received;
a receiving end cluster head is periodically woken up;
if the awoken receiving end cluster head is receiving preamble codes containing address information while awake, the receiving end cluster head judges whether the address information of the destination receiving end cluster head in the preamble codes agrees with the awoken receiving end cluster head address information; if there is a judgment that the address information is in agreement, then the awoken receiving end cluster head sends a preamble codes acknowledgment ACK notifying the transmitting end cluster head to transmit data; if there is not a judgment that the address information is in agreement, then the awoken receiving end cluster head does not send back a preamble codes acknowledgment ACK and goes into dormancy immediately.

2. The chain-type wireless sensor network-oriented hybrid media access control method of claim 1, wherein a subsequent cluster is a cluster head adjacent to a current cluster head in a direction away from a Sink.

3. The chain-type wireless sensor network-oriented hybrid media access control method of claim 1, wherein the cluster heads that acquire data are:
in the first time slot, the third cluster heads after every two cluster heads, counting in a direction away from a Sink;
in the second time slot, the aggregation of cluster heads adjacent to the cluster heads that acquire data in the first time slot in a direction approaching a Sink;
in the third time slot, the aggregation of cluster heads adjacent to the cluster heads that acquire data in the second time slot in a direction approaching a Sink.

4. The chain-type wireless sensor network-oriented hybrid media access control method of claim 1, wherein acquiring sensor data and/or forwarding acquired sensor data require(s) three time slots to complete network transmission scheduling and to prevent data simultaneously transmitted by all cluster members and adjacent clusters from collision with each other.

5. The chain-type wireless sensor network-oriented hybrid media access control method of claim 1, wherein the process of each cluster member transmitting data includes:
time slots are secondarily divided into many mini-time slots;
mini-time slots are allocated based on address designation algorithm; and
cluster members select corresponding mini-time slots in ascending order of addr values to send data;
wherein said addr value is: the allocated address addre[1, Ni] of the cluster member when a cluster member is included in the network, Ni being the number of cluster members in the $i^{th}$ cluster.

6. The chain-type wireless sensor network-oriented hybrid media access control method of claim 1, wherein data forwarding is realized by multiple continuous time slots being allocated to a cluster head, and utilizing the multiple continuous time slots to transmit multiple data packages.

7. The chain-type wireless sensor network-oriented hybrid media access control method of claim 1, wherein each cluster is made to have the same cluster wake-up time in the duty cycle by a cluster head recording the wake-up time of the adjacent cluster in the duty cycle $T_{duty\text{-}cycle}$.

8. The chain-type wireless sensor network-oriented hybrid media access control method of claim 1, wherein said wake-up time is designed as follows:
the wake-up time $T_{schedule}$ between adjacent cluster heads satisfies the following conditions:
wherein, δ represents the time required by the cluster head for receiving data, including transmission time of the data excluding the preamble codes and dwell time; $T_{offset\_max}$ represents the maximum clock offset between the transmitting end and the receiving end, determined by the synchronizing cycle and the frequency offset of the cluster head and cluster members;
the address ADDRs of the cluster head and cluster members are used to indicate the position information of the cluster head and cluster members, and the wake-up time of the cluster head and cluster members are set as:
wherein, $T_{wake}$ represents the wake-up time of the cluster head or cluster members, $T_{schedule}$ represents the wake-up time between adjacent cluster heads, $T_{duty\_cycle}$ represents the duty cycle of the cluster head or cluster members, ADDR represents the address of the cluster head or cluster members, and the symbol ">>" is a right shift operator.

9. A chain-type wireless sensor network-oriented hybrid media access control method, wherein in a wireless sensor network, if a proportion of cluster heads and cluster members which simultaneously transmit data reaches a certain value, a time division access control Pipelined TDMA is used, comprising:
in every time slot, cluster heads in the network acquire sensor data of all cluster members in subsequent clusters; and
cluster heads that acquire sensor data forward acquired sensor data;
in the wireless sensor network, if a proportion of cluster heads and cluster members which simultaneously transmit data does not reach a certain value, a contention access control S-XMAC is used, in which wake-up time scheduling is based on position information, comprising:
waking up cluster heads and cluster members in order based on geographical positions of cluster heads and cluster members in the network; and
the maximum time required for transmitting the preamble codes $T_{preamble}$ is:

$$T_{preamble} = \begin{cases} T_{duty\_cycle} & (T_{duty\_cycle} \leq 2T_{offset\_max}) \\ 2T_{offset\_max} & (T_{duty\_cycle} > 2T_{offset\_max}) \end{cases}$$

wherein, $T_{preamble}$ represents the maximum time required for transmitting the preamble codes, $T_{duty\_cycle}$ represents the duty cycle of the cluster head or cluster members, and $T_{offset\_max}$ represents the maximum clock offset between the transmitting end and the receiving end.

* * * * *